2,987,375
PURIFICATION OF FLUORIDE SALTS
Warren R. Grimes, Oak Ridge, Tenn., assignor to the United States of America as represented by the United States Atomic Energy Commission
No Drawing. Filed Feb. 19, 1958, Ser. No. 716,249
3 Claims. (Cl. 23—14.5)

My invention relates to a method for the purification of inorganic salts and more particularly to a method for purifying metallic fluorides.

Because of their favorable properties, including low neutron absorption cross-section, low vapor pressure, and high thermal stability, molten fluorides are useful as fuels, fuel carriers, and coolants in neutronic reactors. Typically the fuels are comprised of a molten mixture of zirconium tetrafluoride, at least one alkali fluoride, and at least one uranium fluoride selected from uranium trifluoride and uranium tetrafluoride. Several examples of typical fuel compositions are the following:

$LiF—ZrF_4—UF_4$

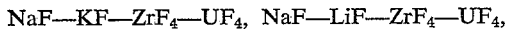

$NaF—KF—ZrF_4—UF_4$, $NaF—LiF—ZrF_4—UF_4$,

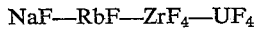

$NaF—RbF—ZrF_4—UF_4$ and $RbF—ZrF_4—UF_4$. For additional information concerning fuel compositions attention is invited to the co-pending application of the common assignee, Serial No. 600,639, "Reactor Fuel Composition," filed July 27, 1956, in the names of Charles J. Barton and Warren R. Grimes, now U.S. Patent No. 2,920,024, issued January 5, 1960.

For information concerning the theory, construction, and operation of neutronic reactors, reference is made to the following publications: Glasstone and Edlund, The Elements of Nuclear Reactor Theory; Glasstone, Principles of Nuclear Reactor Engineering; and The Reactor Handbook (3 volumes, AECD-3645, 3646, and 3647), for sale by the Superintendent of Documents, U.S. Government Printing Office, Washington, D.C. For detailed information concerning reactors designed to operate with a molten fluoride fuel, reference is made to the co-pending application of the common assignee, Serial No. 699,-428, "Neutronic Reactor," filed November 27, 1957, in the names of Arthur P. Fraas and Carroll B. Mills as well as to the above-identified application Serial No. 600,639.

In the preparation of fused fluoride mixtures for use in neutronic reactors, considerable care is exercised to ensure that the mixtures are of high purity. Ordinarily, however, certain contaminants remain in the mixtures. In the case of the fuel mixture $NaF—ZrF_4—UF_4$, for example, the NaF component often contains as much as 0.4% $H_2O$ and as much as 200–300 p.p.m. sulfur (chiefly as the sulfate ion). The $ZrF_4$ component normally contains traces of Fe, $ZrOF_2$, and $ZrO_2$. The $UF_4$ component commonly is contaminated with traces of $H_2O$, $UO_2$ and hexavalent uranium (probably as $UO_2F_2$). Those contaminants aggravate the corrosion action of the fused fluorides and it is therefore important that they be reduced to a low level. There was no method available in the prior art which would reduce the contaminants in a fluoride salt to the level desired for use in a neutronic reactor.

One object of my invention is to provide a method for removing contaminants from a mixture of fused fluoride salts.

Another object is to provide a method for reducing the contaminants in a fluoride salt to such a level that the resulting salt is suitable for use in a neutronic reactor.

Another object is to provide a method for purifying neutronic reactor fuels comprised of a mixture of metal fluorides.

In accordance with my invention extraneous impurities can be removed from a mixture of fluoride salts by melting said mixture under an inert atmosphere, and subjecting the resulting fluoride melt to consecutive treatment with hydrogen, gaseous HF, and hydrogen.

The impurities usually present in fluoride reactor fuels, fuel carriers, and coolants, which consist of uranium in an oxidation state greater than four, uranium oxides, and oxyfluorides, zirconium oxides and oxyfluorides, water, nickel, iron, chromium, sulfur and chlorides are substantially completely removed by my process, and any contaminants which remain are present in such a low concentration as to be of negligible corrosive effect.

In carrying out my invention the fluoride salt or mixture of fluoride salts to be purified is placed in a controlled-atmosphere reaction vessel provided with heating means and means for introducing gases. The vessel may be constructed of any suitable corrosion-resistant material. A vessel made of nickel is suitable and a copper-lined vessel such as a copper-lined stainless steel vessel is particularly satisfactory.

The fluoride salts are then melted under an inert atmosphere. Any gas which is inert to the salt mixture and equipment may be used. Helium and argon are suitable gases and in the preferred method of carrying out my invention, the fluoride salts are melted under an atmosphere of anhydrous HF. After the mixture has melted hydrogen is introduced into the molten fluoride. In contacting hydrogen with the molten fluorides, any means which achieves intimate mixture of the melt with the hydrogen may be used. One suitable method is to alternately pressurize the system with the gas and then to evacuate it. In the preferred procedure the gas is bubbled through the molten salt. The amount of hydrogen used is not critical and will vary depending upon the amount of impurities and the initimacy of contact with the melt. For the impurities normally found in a 250 pound fused salt mixture, bubbling hydrogen through the melt for a period of approximately one hour at a rate of approximately 3–5 liters per minute is adequate.

The molten salt is then brought into intimate contact with HF. The procedure used may be the same as in the preceding step. The amount of HF needed and the time required are not critical and ordinarily a feed rate of 3–5 liters per minute for a 250 pound batch for a period of 2–3 hours is adequate.

After the HF treatment hydrogen is again brought into intimate contact with the molten salt. The procedure used may be the same as in the preceding steps. This final hydrogen treatment varies in length of time depending upon the amount of impurities contained in the batch and the completion time may be determined by sampling the exit gas. The final hydrogen treatment flushes residual HF from the previous step and reduces fluorides of metallic impurities such as iron and nickel to the metallic state in which they deposit on the vessel walls. In this step decrease in the amount of HF evolved is a measure of the purification being effected. A high degree of purity is achieved when the exit gases contain no more than approximately $1\times10^{-4}$ moles HF per liter of exit gas.

Although not necessary to my process, the molten salt may then be purged of hydrogen and residual HF by alternately flushing with any inert gas and evacuating the system. Helium is suitable for this purpose.

In the foregoing steps the temperature of the molten salt may be varied over a wide range. The lower limit is determined by the melting point of the salt being purified, and equipment limitations fix the upper temperature. It is preferred to purify the salt at a temperature substantially above the melting point of the molten salt, and a temperature from approximately 600° C. to 800° C. is preferred.

Having thus described my invention, the following examples are given to illustrate my invention in greater detail.

EXAMPLE I

A 250 pound batch of a neutronic reactor fuel consisting of 46% NaF, 50% $ZrF_4$, and 4% $UF_4$ and containing approximately 250 p.p.m. iron, 100 p.p.m. chromium, 100 p.p.m. nickel, 150 p.p.m. $ZrO_2$ and 200 p.p.m. $UO_2$ was placed as a powder in a cylindrically-shaped copper-lined stainless steel vessel. The vessel was 48 inches high by 13½ inches in diameter and was provided with means for introducing He, $H_2$, and HF near the bottom of the vessel. In order to remove air the vessel was pressurized with helium and then evacuated. The vessel was then pressurized with HF and heated to 1500° F. The HF was then evacuated, and $H_2$ was introduced into the melt by bubbling it upward through the melt at a rate of 4 liters per minute. After approximately an hour the introduction of $H_2$ was stopped and HF was bubbled upward into the melt at a rate of 4 liters per minute for a period of two hours. The flow of HF was then stopped and the step of introducing $H_2$ was repeated. The $H_2$ was permitted to flow at a rate of 4 liters per minute until an analysis of the exit gas showed a concentration of less than $1\times10^{-4}$ moles of HF per liter of gas. The last step took 30 hours. Samples from the purified melt were subjected to a petrographic analysis. No oxide contamination was found. A chemical analysis showed the presence of iron, chromium, and nickel in the following concentrations.

Contaminant: P.p.m.
- Iron — 30
- Chromium — <10
- Nickel — <10

EXAMPLE II

Runs were made purifying 14 batches of a fluoride salt mixture consisting of 50 mole percent NaF and 50 mole percent $ZrF_4$ and containing 150 p.p.m. sulfur, 75 p.p.m. chloride ion, 250 p.p.m. iron, 100 p.p.m. chromium, and 200 p.p.m. nickel. Each batch weighed 250 pounds. The purification procedure used in Example I was followed for each batch. After purification a chemical analysis was made; and iron, chromium, nickel, sulfur and chloride were found in the amounts given in the following table.

Table I
CONTAMINANTS REMAINING IN PURIFIED FLUORIDE MIXTURE

[Salt composition: 50 mole percent NaF; 50 mole percent $ZrF_4$]

| Run No. | P.p.m. | | | | |
|---|---|---|---|---|---|
| | Fe | Cr | Ni | S | Cl⁻ |
| 1 | 30 | <10 | <10 | <10 | <10 |
| 2 | 45 | <20 | <20 | <10 | <10 |
| 3 | 60 | <10 | 25 | <10 | <10 |
| 4 | 55 | <20 | 45 | <10 | <10 |
| 5 | 80 | <20 | <20 | <10 | <10 |
| 6 | 35 | <20 | 30 | <10 | <10 |
| 7 | 35 | <20 | 30 | <10 | <10 |
| 8 | 35 | <20 | <20 | <10 | <10 |
| 9 | 35 | <20 | <20 | <10 | <10 |
| 10 | 45 | <20 | 35 | <10 | <10 |
| 11 | 40 | <20 | 35 | <10 | <10 |
| 12 | 30 | <20 | <20 | <10 | <10 |
| 13 | 40 | <20 | 30 | <10 | <10 |
| 14 | <20 | <20 | 35 | <10 | <10 |

It is apparent that the foregoing examples are merely illustrative uses of my invention and are not intended to be restrictive. Thus any inorganic fluoride salt or mixture of such salts chemically stable to hydrogen at high temperatures may be purified in the above manner. Since the invention is inherently of wide applicability, it is intended to be limited only as is indicated by the appended claims.

Having thus described my invention, I claim:

1. In a process for the purification of a material consisting essentially of at least one inorganic fluoride selected from the group consisting of the alkali metal fluorides, lower uranium fluorides, and zirconium fluorides, and containing extraneous impurities, the steps which comprise melting said material under an inert atmosphere, and subjecting the resulting molten material to a series of gas treatment steps comprising intimately contacting the resulting molten material with hydrogen, intimately contacting the resulting hydrogen-treated molten material with gaseous hydrogen fluoride, and, as a final gas treatment step, intimately contacting the resulting hydrogen fluoride-treated molten material with hydrogen.

2. The process of claim 1 wherein the material purified is comprised of zirconium tetrafluoride, at least one alkali metal fluoride, and at least one uranium fluoride selected from uranium trifluoride and uranium tetrafluoride.

3. The process of claim 2 wherein the extraneous impurities are principally $H_2O$, $SO_4^=$, $ZrOF_2$, $ZrO_2$, Ni, Cr, Fe, $UO_2$, Cl⁻, and $UO_2F_2$.

References Cited in the file of this patent

UNITED STATES PATENTS

| 2,785,047 | Brown et al. | Mar. 12, 1957 |
| 2,900,226 | Schaap | Aug. 18, 1959 |
| 2,908,548 | Cacott | Oct. 13, 1959 |

OTHER REFERENCES

Grimes: BNL-483, Jan. 9-10, 1958, pp. 132, 133. (Copy in Scientific Library.)